(12) United States Patent
Ji et al.

(10) Patent No.: US 8,503,486 B2
(45) Date of Patent: *Aug. 6, 2013

(54) SYNCHRONIZING WIRELESS LOCAL AREA NETWORK ACCESS POINTS

(75) Inventors: Lusheng Ji, Randolph, NJ (US); Robert Miller, Convent Station, NJ (US); Harry Worstell, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,288

(22) Filed: Nov. 2, 2011

(65) Prior Publication Data

US 2012/0044924 A1   Feb. 23, 2012

Related U.S. Application Data

(63) Continuation of application No. 11/999,302, filed on Dec. 5, 2007, now Pat. No. 8,077,614.

(51) Int. Cl.
*H04J 3/06* (2006.01)

(52) U.S. Cl.
USPC ............................. 370/503; 370/230; 370/252

(58) Field of Classification Search
USPC ................. 370/503, 350, 230, 235, 344, 241, 370/508, 510
See application file for complete search history.

(56) References Cited

U.S. PATENT DOCUMENTS

| | | | |
|---|---|---|---|
| 6,799,054 | B2 | 9/2004 | Shpak |
| 7,120,092 | B2 | 10/2006 | del Prado Pavon et al. |
| 7,151,945 | B2 | 12/2006 | Myles et al. |
| 7,154,862 | B2 | 12/2006 | Krzyzanowski |
| 7,233,602 | B2 | 6/2007 | Chen et al. |
| 7,236,502 | B2 | 6/2007 | Del Prado Pavon et al. |
| 7,239,626 | B2 | 7/2007 | Kandala et al. |
| 7,555,004 | B2 | 6/2009 | Orlik et al. |
| 2006/0029073 | A1 | 2/2006 | Cervello et al. |
| 2007/0211749 | A1 | 9/2007 | Benveniste |

OTHER PUBLICATIONS

IEEE Std 802.11—2007, pp. 79-81, pp. 419-425.

*Primary Examiner* — Dady Chery
(74) *Attorney, Agent, or Firm* — Wolff & Samson, PC (57) ABSTRACT

In a wireless local area network, a first and second access point in which the RF coverage areas overlap are synchronized by positioning a monitor station within the overlap area. The monitor station receives beacon frames from both access points and records the arrival times. A manager in communication with both access points and the monitor station calculates a retardation interval and issues a control command to the second access point to retard transmission of its beacon frame. The retardation interval is calculated such that the contention-free period of the second access point does not overlap the contention-free period of the first access point. The manager may also issue control commands to the first and second access points to adjust their contention-free periods.

10 Claims, 9 Drawing Sheets

SYNCHRONIZING WIRELESS LOCAL AREA NETWORK ACCESS POINTS

This application is a continuation of prior application Ser. No. 11/999,302 filed on Dec. 5, 2007, which is herein incorporated by reference in its entirety.

BACKGROUND OF THE INVENTION

The present invention relates generally to wireless local area networks, and more particularly to synchronization of wireless local area network access points.

Popular communications services, such as access to the global Internet, e-mail, and file downloads, are provided via connections to packet data networks. To date, user devices, such as personal computers, have commonly connected to a packet data network via a wired infrastructure. For example, a patch cable connects the Ethernet port on a personal computer to an Ethernet wall jack, which is connected by infrastructure cabling running through the walls of a building to network equipment such as a switch or router. There are disadvantages to a wired infrastructure. From a network perspective, providing packet data services to homes and commercial buildings requires installation of infrastructure cabling. From a user perspective, access to the network is limited to availability of a wall jack, and mobility is limited by the length of the patch cable.

Wireless local area networks (WLANs) provide advantages both for network provisioning and for customer services. For a network provider, a WLAN reduces required runs of infrastructure cabling. For a network user, a WLAN provides ready access for mobile devices such as laptop computers and personal digital assistants. WLANs were first deployed in commercial installations. As the price of WLAN network equipment has dropped, and as residential broadband services have become widely deployed, however, WLANs in homes are becoming commonplace. In a typical installation, a wireless router connects to a modem which connects to an Internet service provider (ISP) via a broadband access line such as digital subscriber line (DSL), cable, or fiber optics. A laptop, for example, outfitted with a wireless modem card, then communicates with the wireless router over a radiofrequency (RF) link. The wireless router provides access to the ISP for multiple laptops within the RF coverage area of the wireless router.

WLANs may be configured via various network schemes. Some are proprietary, and some follow industry standards. At present, many widely deployed WLANs follow the IEEE 802.11 standards. WLANs based on these standards are popularly referred to as WiFi. In examples discussed below, WLANs refer to networks based on the IEEE 802.11 standards. Embodiments of the invention, however, are applicable to other WLANs.

WLANs may be further classified by architecture. In a mobile ad-hoc network, wireless devices, such as laptops outfitted with wireless modems, communicate directly with each other in a peer-to-peer mode. In an infrastructure network, wireless devices communicate via an RF connection to an access point. A home WLAN typically will be served by a single access point, such as the wireless router. Wireless devices within the RF coverage area of the wireless router connect to the broadband service via the single access point. Wireless devices may also communicate with each other via the single access point.

To provide RF coverage over a wider area, such as in an airport, multiple access points are often required. The RF coverage areas of multiple access points may overlap. In some instances, the overlap is intentional to provide seamless coverage. In other instances, the overlap is unintentional since the boundaries of RF coverage areas are not sharply defined. RF coverage areas may also overlap if more than one network is operating in the same location. For example, in a commercial environment, competing network providers may be offering services in the same, or an adjacent, location. In a residential environment, such as an apartment complex or a neighborhood in which houses are close together, WLANs independently operated by neighbors may overlap in RF coverage area.

In a widely deployed WLAN protocol, devices communicate with each other over a common channel on a contention basis. That is, each device attempts to seize the channel. At a given instance, if there are multiple contending devices, the device which actually seizes the channel is governed by a carrier sense multiple access/collision avoidance (CSMA/CA) protocol and a random backoff mechanism. When a device wants to transmit, it first senses the medium (RF channel) to determine whether the medium is busy. The medium is busy if there is already data traffic on the RF channel. If the medium is not busy, the device transmits after a delay period. If the medium is determined to be busy, the device defers until the end of the current transmission. After deferral, or prior to attempting to transmit again immediately after a successful transmission, the device selects a random backoff interval and decrements a backoff interval counter while the medium is idle.

In addition to the above CSMA/CA channel access mechanism, WLANs may support another channel access mechanism called scheduled access mode. Under this mode, devices are individually polled by a channel access coordinator. For example, in a WLAN controlled by a single access point, the access point may serve as a channel access coordinator to coordinate the devices in the network. Under scheduled access mode, devices do not need to execute the carrier sensing and backoff mechanisms. At a given instance, only the one device being polled is allowed to transmit. Also, due to the deterministic nature of scheduled access, service quality, in some instances, may be guaranteed by the channel access coordinator's polling schedule. The same WLAN system may support both CSMA/CA and scheduled access modes. In such a WLAN system, time periods in which the system operates in CSMA/CA mode, known as contention periods (CP), alternate with time periods in which the system operates in scheduled access mode, known as contention-free periods (CFPs).

For a specific WLAN, devices communicate with each other over a common channel. If a second network, whose RF coverage area overlaps the RF coverage area of the first network, operates on the same channel, then co-channel interference may occur. Co-channel interference may occur, for example, if there is no time synchronization and network coordination between the access points in the two networks. Transmissions from devices and access points in the second network may interfere with transmissions from devices and access points in the first network. That is, collision between data frames may occur, and the data throughput of the first network may effectively be reduced. The data throughput of the second network may similarly be reduced because of interfering transmissions from devices and access points in the first network.

As discussed in more detail below, transmission intervals are partitioned into well-defined beacon intervals, which are delimited by beacon frames. A beacon interval starts with a first beacon frame, which contains timing information and other network control parameters. The beacon interval ends with a second beacon frame, which also marks the beginning of the next beacon interval. In some network configurations, the beacon frame is used to synchronize the clocks on the devices to the clock on the access point. The sequence of beacon intervals is then synchronized throughout the WLAN. In IEEE 802.11 systems that enable both CSMA/CA and scheduled access modes, the time period that immediately follows the beacon frame is dedicated for CFP, and the rest of the beacon interval is dedicated for CP. As a result, there are well-defined CFPs during which the access point does not need to contend with traffic from the devices. During the CFPs, WLAN devices may also transmit high-priority messages and messages with high quality of service (QoS) requirements.

The above synchronization mechanism may work well if a single access point synchronizes all the devices operating on the common channel. If two independent access points have overlapping RF coverage areas and operate over the same channel, however, devices located in the overlap area may be subjected to co-channel interference when they operate during CFPs. This may occur, for example, if a CFP in the first network overlaps a CFP in the second network. If a device in the first network and a device in the second network simultaneously transmit in a CFP mode, there may be a high probability of collision between data frames.

In general, there is no synchronization between the clocks of different access points. Also, in general, there is no coordination between the operations of different access points. The IEEE 802.11 standards do not explicitly address synchronization and coordination of different access points. Various options are available. For example, consider two access points. If the first access point receives the beacon messages (carried in the beacon frames) from the second access point, then the first access point may determine the CFP configuration of the second access point. The first access point may then adjust its own CFP configuration to reduce, minimize, or eliminate co-channel interference. Similarly, if the second access point receives the beacon messages from the first access point, the second access point may adjust its own CFP configuration accordingly.

In a more general case, however, an access point does not necessarily receive beacon messages from other access points, and a different method for synchronization is required. Herein, wireless network elements refer to wireless access points and wireless devices. In general, a wireless network element has a system clock that provides timing for control and communication processes running in the wireless network element, and a separate radio clock that provides timing for the RF transmitter and receiver. The beacon intervals and their corresponding CFPs are referenced with respect to the radio clock. In general, the system clock and the radio clock are not well synchronized. System clocks of different network elements (wireless or wired) may be synchronized by mechanisms such as network time protocol (NTP), in which the system clocks are slaved to a master clock over a network. These mechanisms, however, do not synchronize their radio clocks. Additionally, heavy network traffic may degrade network synchronization. Network design and operations may also make translating system clock synchronization into radio clock synchronization difficult. What is needed is method and apparatus for providing stable, high resolution synchronization of radio clocks of multiple access points.

BRIEF SUMMARY OF THE INVENTION

For an infrastructure wireless local area network in which the RF coverage areas of two access points overlap, synchronization of the access points is required to maintain high transmission quality for stations located within the overlapping RF coverage area. Data transmission intervals from an access point are partitioned into a contention-free period and a contention period. During a contention period, transmissions from the access point and stations associated with the access point are governed by a carrier sense multiple access/collision avoidance (CSMA/CA) protocol. During a contention-free period, the access point overrides the CSMA/CA protocol and seizes control of the channel. A station located in the region of overlapping RF coverage may receive transmissions from both access points. The first and second access points are not normally synchronized. If the contention-free period of the second access point overlaps with the contention-free period of the first access point, transmissions from the two access points during the overlap period may have a high probability of colliding.

Embodiments of the invention reduce, minimize, or eliminate the interval in which the two contention-free periods overlap. A monitor station positioned in the area of overlapping RF coverage receives beacon frames from both access points and records the arrival times of the beacon frames. A manager in communication with both access points and the monitor station receives the beacon information reported by the monitor station and calculates a retardation interval for retarding transmission of the beacon frames from the second access point. The retardation interval is calculated to reduce, minimize, or eliminate the overlap between the contention-free period of the second access point and the contention-free period of the first access point. The manager issues a control command to the second access point to retard transmission of its beacon frame by the retardation interval. In embodiments of the invention, the manager may also issue commands to the first and access points to adjust their contention-free periods.

These and other advantages of the invention will be apparent to those of ordinary skill in the art by reference to the following detailed description and the accompanying drawings.

DETAILED DESCRIPTION

Figure 1:
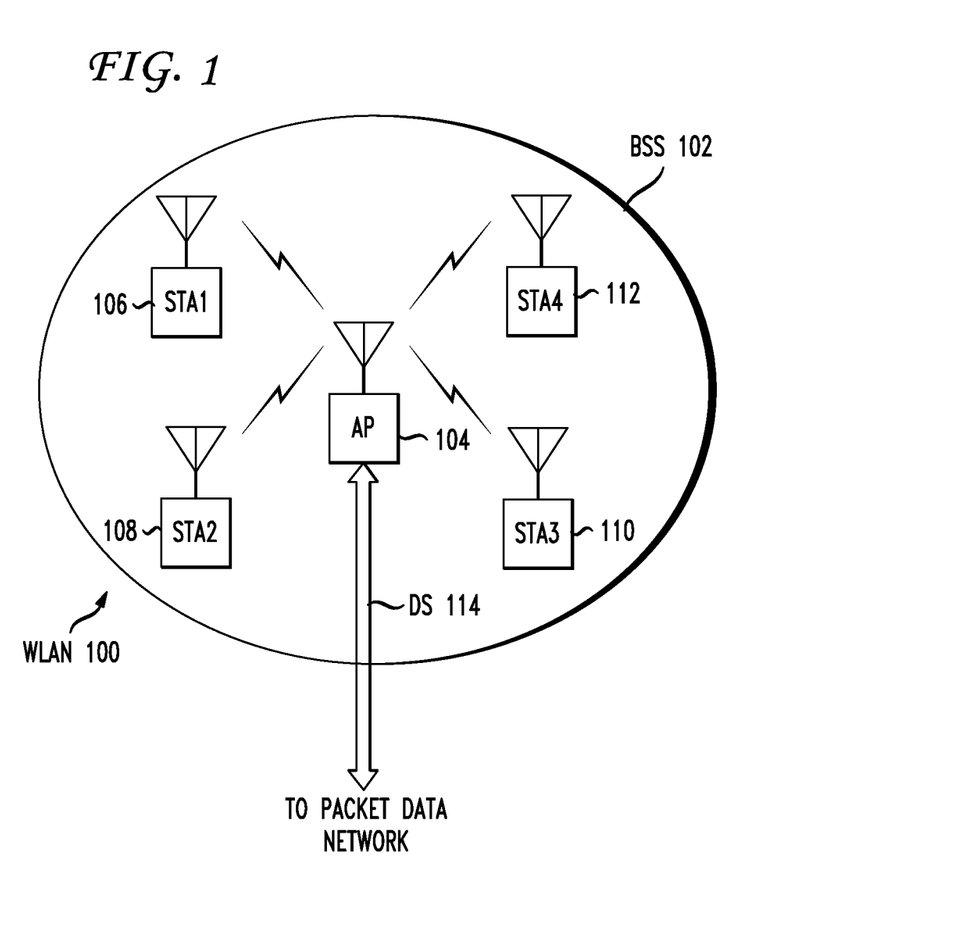
FIG. 1 shows a high-level schematic of a wireless local area network with a single access point.

FIG. 1 shows the basic network architecture of WLAN 100 with a single access point AP 104. The nomenclature of the IEEE 802.11 standards is used herein. In a WLAN, any addressable device may be called a station (STA). Stations may be fixed, portable, or mobile. A portable STA is a device which is capable of being moved from place to place, such as a laptop which may be moved from one desk to another. During operation, however, a portable device is stationary. A mobile STA is a user device, such as a laptop or personal digital assistant, which is in actual motion during operation. In FIG. 1, four stations, STA1 106-STA4 112, are shown. The stations STA1 106-STA4 112 communicate over RF links with access point AP 104, which connects via distribution system DS 114 to a packet data network, details of which are not shown. An example of a distribution system is a wired Ethernet local area network (LAN).

An AP may be considered as a special class of STA. It provides management service, as well as access service for other STAB associated with the access point (see below) to the distribution system. The area over which an access point provides service is referred to as the basic service area (BSA). The BSA is approximately defined by the RF coverage of the access point, and is nominally fixed. Changes in the RF environment, such as arising from building reconstruction or movement of large equipment, however, may alter the BSA topology.

Stations within the BSA form a network connection to a WLAN by becoming associated with the access point. The set of stations associated with an access point is referred to as the basic service set (BSS) of the access point. These stations are also referred to as members of the associated BSS. In WLAN 100, the basic service set BSS 102 of the access point AP 104 is the set of stations STA1 106-STA4 112 associated with access point AP 104. In FIG. 1, the oval representing BSS 102 pictorially indicates the region of the BSA. The IEEE 802.11 standards, however, labels the region with the associated BSS. This convention is followed herein. Association provides several functions. An important one is mapping a network address of an STA to a network address reachable by the packet data network via the DS. At any given instance, an STA is associated with one and only one AP. Since stations may move in and out of the BSA, the BSS of an access point in general is dynamic. If the set of associated stations does not change, then the BSS is static.

In a WLAN BSS, STAB communicate with the AP over a common RF channel. Medium access control (MAC) for multiple STAB is governed by a carrier sense multiple access with collision avoidance (CSMA/CA) protocol and a random backoff mechanism. When a STA wants to transmit, it first senses the medium (RF channel) to determine whether the medium is busy. The medium is busy if traffic is already present on the RF channel. If the medium is not busy, the STA transmits after a delay period. If the medium is determined to be busy, the STA defers until the end of the current transmission. After deferral, or prior to attempting to transmit again immediately after a successful transmission, the STA selects a random backoff interval and decrements a backoff interval counter while the medium is idle. Messages are sent via MAC frames. A higher-level protocol may be also be used in some instances to further minimize collision. The transmitting and receiving STAB exchange short control frames after determining that the medium is idle and after any deferrals or backoffs, prior to data transmission. These control frames are referred to as Request to Send (RTS)/Clear to Send (CTS) frames. Herein, data refers to a set of bits, regardless of whether the bits represent user data, control messages, or any other type of message. CSMA/CA is one example of a contention-based protocol. Embodiments of the invention are applicable to other contention-based protocols.

As discussed previously, in general, a wireless network element has separate clocks for providing timing for different functional components. One clock, referred to herein as the system clock, provides timing for control processes running in the wireless network element. The system clock also provides timing for communications between one wireless network element and another wireless network element, or for communications between a wireless network element and a wired network element, such as, a server, a switch, or a router. The other clock, herein referred to as the radio clock, provides timing for the RF transmitter and receiver. In general, the system clock and the radio clock are not well synchronized.

Figure 2:
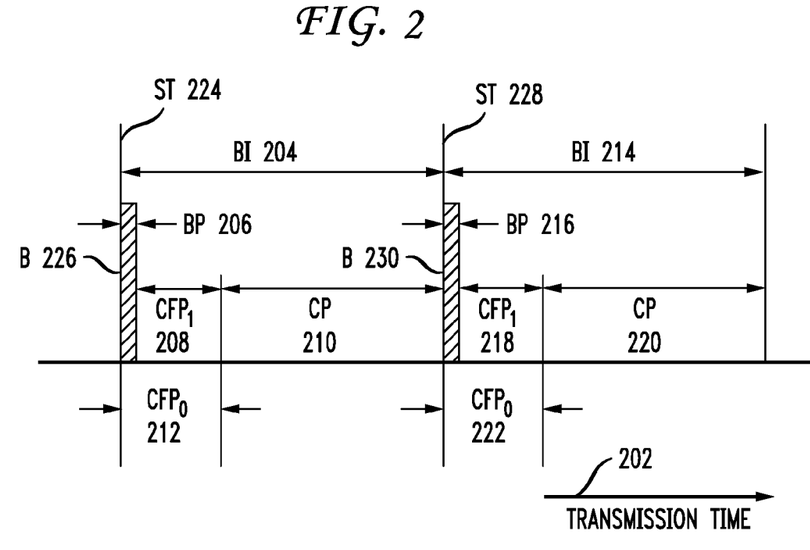
FIG. 2 shows a high-level schematic of transmission periods for a single access point.

The IEEE 802.11 standards support a protocol in which transmission intervals are partitioned into beacon intervals (BIs). For an infrastructure WLAN, FIG. 2 is a pictorial representation of transmission intervals from an AP. The horizontal axis 202 represents the transmission time, which is referenced with respect to the radio clock of the AP. At periodic intervals, referred to as beacon intervals, the AP transmits beacons, which provide timing and other control functions. Further details of beacons are discussed below. Shown in FIG. 2 are two consecutive beacon intervals, BI 204 and BI 214. Each BI is delimited by the start time of a new beacon frame (see discussion below). For example, the start of BI 204 is delimited by ST 214 of beacon B 226. The end of BI 204 is delimited by ST 228 of beacon B 230. The start time of a beacon is the time at which the first bit of the beacon is transmitted.

A beacon is a frame with a frame body containing a number of fields, as specified in the IEEE 802.11 standards. The first field contains a timestamp, referenced to the radio clock of the AP, and the second field specifies the beacon interval. The timestamp has a modulus $2^{64}$, counting in microseconds. The beacon interval field represents the number of time units between target beacon transmission times. A time unit is equal to 1024 microseconds. The term "target" beacon transmission time is used because the actual transmission time may be delayed if there is heavy traffic on the RF channel.

The IEEE 802.11 standards support a protocol that further partitions a beacon interval into a contention free-period (CFP) and a contention period (CP). During the CP, transmission of data is governed by the CSMA/CA protocol (CP mode) described above. During the CFP, the access point seizes the channel (CFP mode) for the duration of the CFP and polls its associated stations for transmissions. In the IEEE 802.11 standards, the CFP includes the transmission period of the beacon itself. The portion of the CFP excluding the transmission period of the beacon is then the "remaining portion of the CFP". To simplify the notation, the transmission period of the beacon is referred to herein as the beacon period BP. The total CFP including the beacon period is referred to herein as $CFP_0$. The remaining portion of the CFP is referred to herein as $CFP_1$. Hence, $CFP_1=CFP_0-BP$. In FIG. 2, the beacon interval BI 204 is partitioned into the total contention-free period $CFP_0$ 212 and the contention period CP 210. The total contention-free period $CFP_0$ 212 is the sum of the beacon period BP 206 and the remaining portion $CFP_1$ 208. Similarly, the beacon interval BI 214 is partitioned into the total contention-free period $CFP_0$ 222 and the contention period CP 220. The total contention-free period $CFP_0$ 222 is the sum of the beacon period BP 216 and the remaining portion $CFP_1$ 218.

A beacon specifies key operational parameters supported in the BSS associated with a specific AP. As discussed above, two key parameters are the timestamp and the beacon interval. The beacon also specifies the parameters for configuring the CFP and CP. Additional parameters include quality of service (QoS) capability and power constraint. To increase the probability that the STAs within the BSS receive the beacon, the AP transmits the beacon in a contention-free mode, during which it bypasses the CSMA/CA protocol. In an infrastructure BSS, one mechanism for enforcing QoS is polling. The AP acts as master controller for the BSS. In the IEEE 802.11 standards, the master controller is referred to as the point coordinator (PC). Each STA transmits only when it is polled. Since only one STA is polled at any given time, collisions between frames transmitted by two or more STAs are avoided. The polling mechanism is configured by instructions transmitted from the AP in a contention-free mode.

In a single BSS, synchronization among STAs and the AP is performed by a master/slave timing synchronization function (TSF). The radio clock in the access point serves as the master, and the radio clocks in the stations associated with the access point are slaved to the master. The TSF is implemented via timestamps in the beacon frames transmitted by the AP. Each individual STA associated with the AP adjusts its own clock to be synchronized with the timestamp received in the beacon frame. In the IEEE 802.11 standards, however, there is no defined mechanism for APs and STAs in different BSSs to synchronize their clocks. Access points are not required to synchronize their clocks with beacon messages sent by other access points. As discussed below, co-channel interference may result when two or more BSSs overlap in RF coverage area, and the access points are not synchronized.

Figure 3:
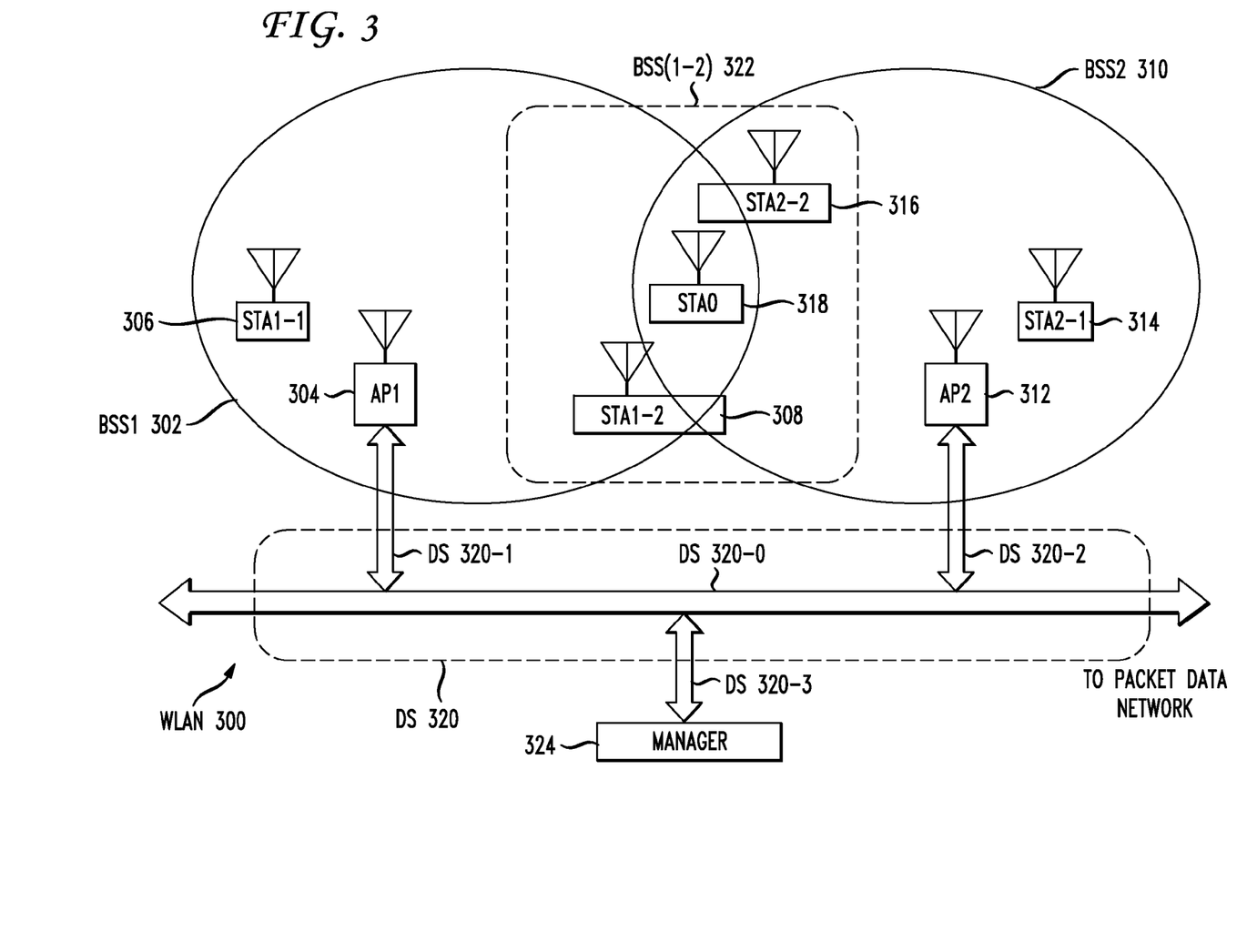
FIG. 3 shows a high-level schematic of a wireless local area network with two access points.

FIG. 3 shows the basic network architecture of WLAN 300, which includes two access points, AP1 304 and AP2 312, and their associated basic service sets, BSS1 302 and BSS2 310, respectively. Stations STA0 318, STA1-1 306, and STA1-2 308 are within the RF coverage area of AP1 304. Stations STA0 318, STA2-1 314 and STA2-2 316 are within the RF coverage area of AP2 312. In the example shown, STA 1-1 306 and STA 1-2 308 are associated with AP1 304. They are member stations of BSS1 302. STA 2-1 314 and STA 2-2 316 are associated with AP2 312. They are member stations of BSS2 310. In the example shown, STA0 318 is not associated with either AP1 304 or AP2 312, and, therefore, is not a member station of either BSS1 302 or BSS2 310. The two access points, AP1 304 and AP2 312, communicate with each other via distribution system DS 320. The IEEE 802.11 standards do not specify details of a distribution system. In common practice, it is a wired infrastructure such as an Ethernet LAN. A distribution system, however, may also be wireless. In the example shown in FIG. 3, DS 320 is a wired Ethernet LAN including a backbone bus DS 320-0 connected to a packet data network, details of which are not shown. Ethernet connections DS 320-1 and DS 320-2 connect AP1 304 and AP2 312, respectively, to backbone bus DS 320-0.

As previously discussed, the RF coverage areas of AP1 304 and AP2 312 are not sharply defined. In the example shown in FIG. 3, BSS1 302 and BSS2 310 intentionally overlap to provide seamless coverage for stations moving between the RF coverage areas of AP1 304 and AP2 312. The overlapping RF coverage areas of AP1 304 and AP2 312 is pictorially represented by the dashed rectangular region BSS(1-2) 322. Stations within BSS(1-2) 322 may receive beacon messages sent by both AP1 304 and AP2 312. In this example, the stations STA0 318, STA1-2 308, and STA2-2 316 are positioned within BSS(1-2) 322.

Figure 4:
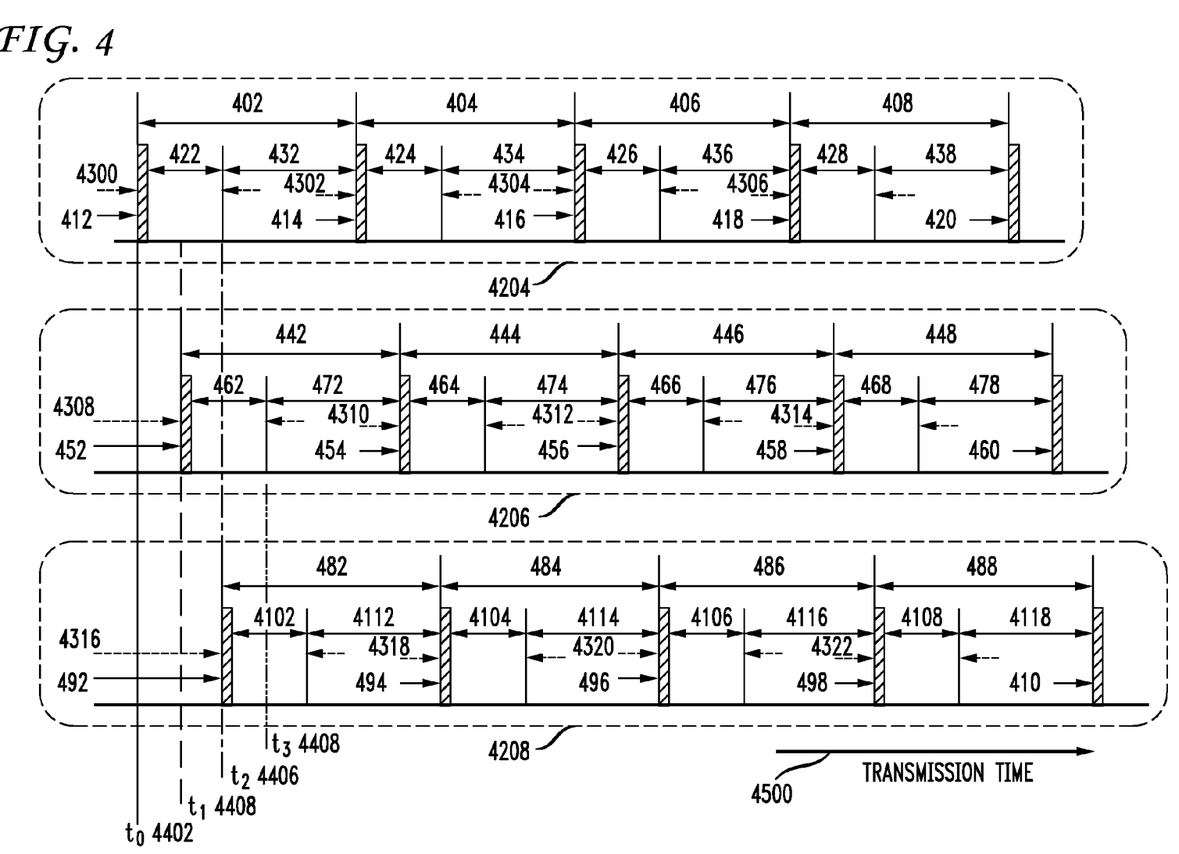
FIG. 4 shows a high-level schematic of transmission periods for two access points.

FIG. 4 shows pictorial representations of the data transmission intervals from AP1 304 and AP2 312. The horizontal axis 4500 represents the transmission time relative to a common reference. Data transmission interval 4204 represents four consecutive beacon intervals transmitted by AP1 304 to stations within BSS1 302. The beacon intervals are delimited by beacons 412-420. The corresponding beacon intervals are 402-408. The total contention free-periods $CFP_0$ are represented by 4300-4306, the corresponding contention-free periods $CFP_1$ by 422-428, and the corresponding contention periods CP by 432-438. Similarly, data transmission interval 4206 represents four consecutive beacon intervals transmitted by AP2 312 to stations within BSS2 310. The beacon intervals are delimited by beacons 452-460. The corresponding beacon intervals are 442-448. The total contention-free periods $CFP_0$ are represented by 4308-4314, the corresponding contention-free periods $CFP_1$ by 462-468, and the corresponding contention periods CP by 472-478. In the example shown, the beacon intervals 402-408 in data transmission interval 4204 are equal to the beacon intervals 442-448 in data transmission interval 4206. Also in the example shown, the total contention-free periods $CFP_0$ 4300-4306 in data transmission interval 4204 are equal to the total contention-free periods $CFP_0$ 4308-4314 in data transmission interval 4206. In general, however, the beacon intervals and total contention-free periods $CFP_0$ in data transmission intervals from two different access points are not required to be equal. Embodiments of the invention apply to instances in which beacon intervals and total contention-free periods $CFP_0$ in data transmission intervals from two different access points are not equal.

Herein, the configuration of the time intervals in a data transmission interval is referred to as the CFP schedule of the associated BSS. The CFP schedule includes the starting time of a beacon interval, the beacon interval, and the total contention-free period $CFP_0$. Shown in FIG. 4 are four reference times, $t_0$ 4402, $t_1$4404, $t_2$ 4406, and $t_3$4408. Referring to data transmission interval 4204 from AP1 304, reference time $t_0$ 4402 is the start of beacon 412, and reference time $t_2$4406 is the end of total contention free period $CFP_0$4300. Referring to data transmission interval 4206 from AP2 312, reference time $t_1$4404 is the start of beacon 452, and reference time $t_3$4408 is the end of total contention-free period $CFP_0$ 4308. Note that $CFP_0$ 4308 in data transmission interval 4206 partially overlaps $CFP_0$4300 in data transmission interval 4204. The overlap interval is specified by $\Delta t = t_2 - t_1$. Referring to FIG. 3, stations STA0 318, STA1-2 308, and STA2-2 316 are located in BSS(1-2) 322, and may receive messages transmitted within BSS1 302 and messages transmitted within BSS2 310. Since messages transmitted during a CFP are not governed by the CSMA/CA protocol, during the overlap interval $\Delta t$, messages transmitted in CFP mode within BSS1 302 may have a high probability of colliding with messages transmitted in CFP mode within BSS2 310.

The IEEE 802.11 standards do not specify a well-defined protocol for resolving data transmission during the overlap interval of two contention free periods, although some transmission control fields are available. An embodiment of the invention reduces, minimizes, or eliminates this overlap interval. Referring to FIG. 3, the station STA0 318, which receives beacons from both AP1 304 and AP2 312, is designated a monitor station. In this example, STA0 318 is not a member of either BSS1 302 or BSS2 310. In general, any station in the overlapping RF coverage area BSS(1-2) 322 may be configured as a monitor station, as long as it is able to receive beacon messages from both access points AP1 304 and AP2 312, and it is able to communicate with the manager 324. For example, STA1-2 308 and STA2-2 316 may be configured to be monitor stations. If no station exists in the overlapping RF coverage area BSS1(1-2) 322, it is not necessary to synchronize the operations between the overlapping BSSs. In advantageous embodiments, STA0 318 is fixed or stationary. Details of the communication link between monitor station STA0 318 and manager 324 are not shown.

Manager 324 connects via connection DS 320-3 to backbone bus DS 320-0. Manager 324 communicates with both AP1 304 and AP2 312. Operations of AP1 304 and AP2 312 may be controlled by manager 324. Manager 324, for example, may be a personal computer, a workstation, or a server. In FIG. 3, manager 324 is shown as a single network element. In other embodiments, manager 324 may comprise two or more network elements which communicate with each other. Typically, manager 324 is accessed by a network administrator. Manager 324 may also communicate with AP1 304 and AP2 312 via a packet data network connected to backbone bus DS 320-0. In an embodiment, an access point may also serve as a manager.

Figure 5:
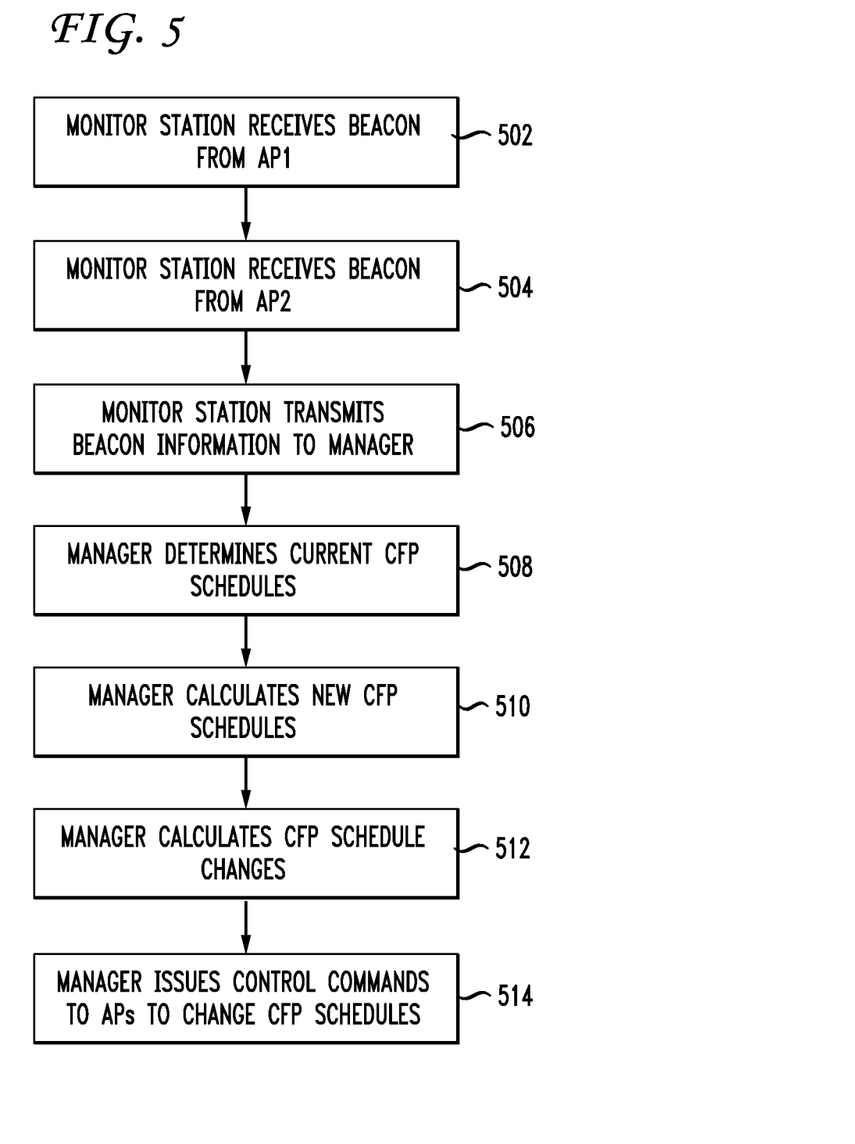
FIG. 5 shows a flowchart of a method for synchronizing the transmission periods for two access points.

FIG. 5 shows a high-level flow chart of the steps performed in accordance with one embodiment of the invention. In step 502, monitor station STA0 318 receives beacons from AP1 304, and records the time that the beacon is received ($t_0$ 4402 in FIG. 4) as part of the beacon information (see below) for BSS1 302. In step 504, monitor station STA0 318 receives beacons from AP2 312, and records the time that the beacon is received ($t_1$ 4404 in FIG. 4) as part of the beacon information for BSS2 310. In step 506, monitor station STA0 318 transmits the aggregate beacon information for both BSS1 302 and BSS2 310 to manager 324. As discussed above, reference time $t_0$ 4402 and reference time $t_1$ 4404 are specified with respect to a common timebase, which may be provided by a variety of means. In one embodiment, reference time $t_0$ 4402 and reference time $t_1$ 4404 are recorded as timestamps issued by the radio clock of monitor station STA0 318. In another embodiment, reference time $t_0$ 4402 and reference time $t_1$ 4404 are recorded as timestamps issued by the system clock of monitor station STA0 318. The beacon information, for example, also includes beacon interval 402 and total contention-free period $CFP_0$ 4300 for data transmission interval 4204 from AP1 304, and the beacon interval 442 and total contention-free period $CFP_0$ 4308 for data transmission interval 4206 from AP2 312. In one embodiment, beacon information is processed by monitor station STA0 318 and transmitted to manager 324. In another embodiment, STA0 318 transmits copies of the beacons from AP1 304 and AP2 312, along with reference time $t_0$ 4402 and reference time $t_1$ 4404, to manager 324.

In step 508, from the aggregate beacon information, manager 324 determines the current CFP schedules for BSS1 302 and BSS2 310. In step 510, manager 324 calculates a new CFP schedule for BSS1 302 and a new CFP schedule for BSS2 310. Various criteria are used for calculating the new CFP schedules. For example, the new CFP schedules may be calculated to reduce, minimize, or eliminate the overlap interval between total contention-free period $CFP_0$ 4300 for data transmission interval 4204 and total contention-free period $CFP_0$ 4308 for data transmission interval 4206. In some instances, the new CFP schedule for data transmission interval 4204 may be unchanged from the current CFP schedule for data transmission interval 4204. In some instances, the new CFP schedule for data transmission interval 4206 may be unchanged from the current CFP schedule for data transmission interval 4206. Other criteria include, for example, minimizing changes to the current CFP schedules, and maintaining a minimum interval between CFPs.

In step 512, for each BSS, the manager 324 calculates the changes to the current CFP schedule to generate the new CFP schedule. In the example shown in FIG. 4, the new CFP schedule for BSS1 302 remains unchanged from the current one, as represented in data transmission interval 4204. The new CFP schedule for BSS2 310, as represented in data transmission interval 4208, however, is changed from the current CFP schedule for BSS2 310, as represented in data transmission interval 4206. In data transmission interval 4208, the beacon intervals 482-488 are delimited by beacons 492-4100. The total contention-free periods $CFP_0$ are represented by 4316-4322, the corresponding contention-free periods $CFP_1$ by 4102-4108, and the corresponding contention periods CP by 4112-4118.

In the new CFP schedule for BSS2 310, as represented in data transmission interval 4208, the beacon intervals and total contention-free periods are unchanged from the corresponding values in the current CFP schedule, as represented in data transmission interval 4206. That is, the beacon intervals 482-488 in data transmission interval 4208 are equal to the beacon intervals 442-448 in data transmission interval 4206, and the total contention-free periods $CFP_0$ 4316-4322 in data transmission interval 4208 are equal to the total contention-free periods $CFP_0$ 4308-4314 in data transmission interval 4206. In general, the beacon interval in a new CFP schedule may differ from the beacon interval in the current CFP schedule. In general, the total contention-free period in the new CFP schedule may differ from the total contention-free period in the current CFP schedule.

In the example shown, the new CFP schedule for BSS2 310, as represented in data transmission interval 4208, is generated from the current CFP schedule, as represented in data transmission interval 4206, by retarding the current CFP schedule by a retardation interval of $\Delta t = t_2 - t_1$. The retardation interval is calculated such that the total contention-free periods $CFP_0$ 4316-4322 in the new CFP schedule, as represented in data transmission interval 4208, of BSS2 310 do not overlap with the total contention-free periods $CFP_0$ 4300-4306 in the (unchanged) CFP schedule, as represented in data transmission interval 4204, of BSS1 302. The start time of retarded beacon 492, reference time $t_2$ 4406, now coincides with the end time of $CFP_0$ 4300, reference time $t_2$ 4406. Therefore traffic in $CFP_0$ 4316 does not interfere with traffic in $CFP_0$ 4300.

In some instances, $\Delta t$ may fluctuate. Fluctuations may result, for example, from delayed beacon message transmissions due to heavy traffic on the medium in either BSS1 302 or BSS2 310. In an advantageous embodiment, $\Delta t$ is calculated from a statistical distribution measured over a series of beacon intervals. For example, $\Delta t$ may be an average value or a median value.

In step 514, manager 324 issues control commands to the APs to change their CFP schedules. In the example shown in FIG. 4, the new CFP schedule for BSS1 302 is unchanged from the current CFP schedule, as represented in data transmission interval 4204. Therefore, manager 324 issues no control command to AP1 304. Alternatively, manager 324 issues a control command to AP1 304 to instruct it to maintain its current CFP schedule. To change the CFP schedule of BSS2 310, manager 324 issues a control command to AP2 312 to retard transmission of beacon 452 (and subsequent beacons) by the retardation interval $\Delta t$. As discussed above, in other embodiments, manager 324 may issue control commands to AP1 304 and AP2 312 to independently adjust their beacon start times, beacon intervals, and total contention-free periods.

In FIG. 4, note that $CFP_0$ 4316 of retarded data transmission interval 4208 overlaps with CP 432 of data transmission interval 4204. During the overlap period, traffic from AP2 312 may have priority over traffic from AP1 304, because traffic from AP1 304 during CP 432 is governed by the CSMA/CA protocol, whereas traffic from AP2 312 during $CFP_0$ 4316 is not. A device in BSS1 302 which wants to transmit during CP 432 must first sense the channel for existing traffic. If there is traffic from a device in BSS2 310, the device in BSS1 302 will defer transmission. A device in BSS2 310 which wants to transmit during $CFP_0$ 4316, however, does not need to sense the channel prior to transmission. If there is existing traffic from a device in BSS1 302 transmitting during CP 432, and if a device in BSS2 310 starts to transmit during $CFP_0$ 4316, the initial frames transmitted by the device in BSS2 310 may collide with existing frames transmitted by the device in BSS1 302. Subsequently, however, the device in BSS2 310 has priority because a device in BSS1 302 which wants to transmit during CP 432 must first sense the channel for existing traffic. If there is currently traffic from a device in BSS2 310 operating in a contention-free mode, a device in BSS1 302 operating in a contention mode will defer transmission.

Figure 6:
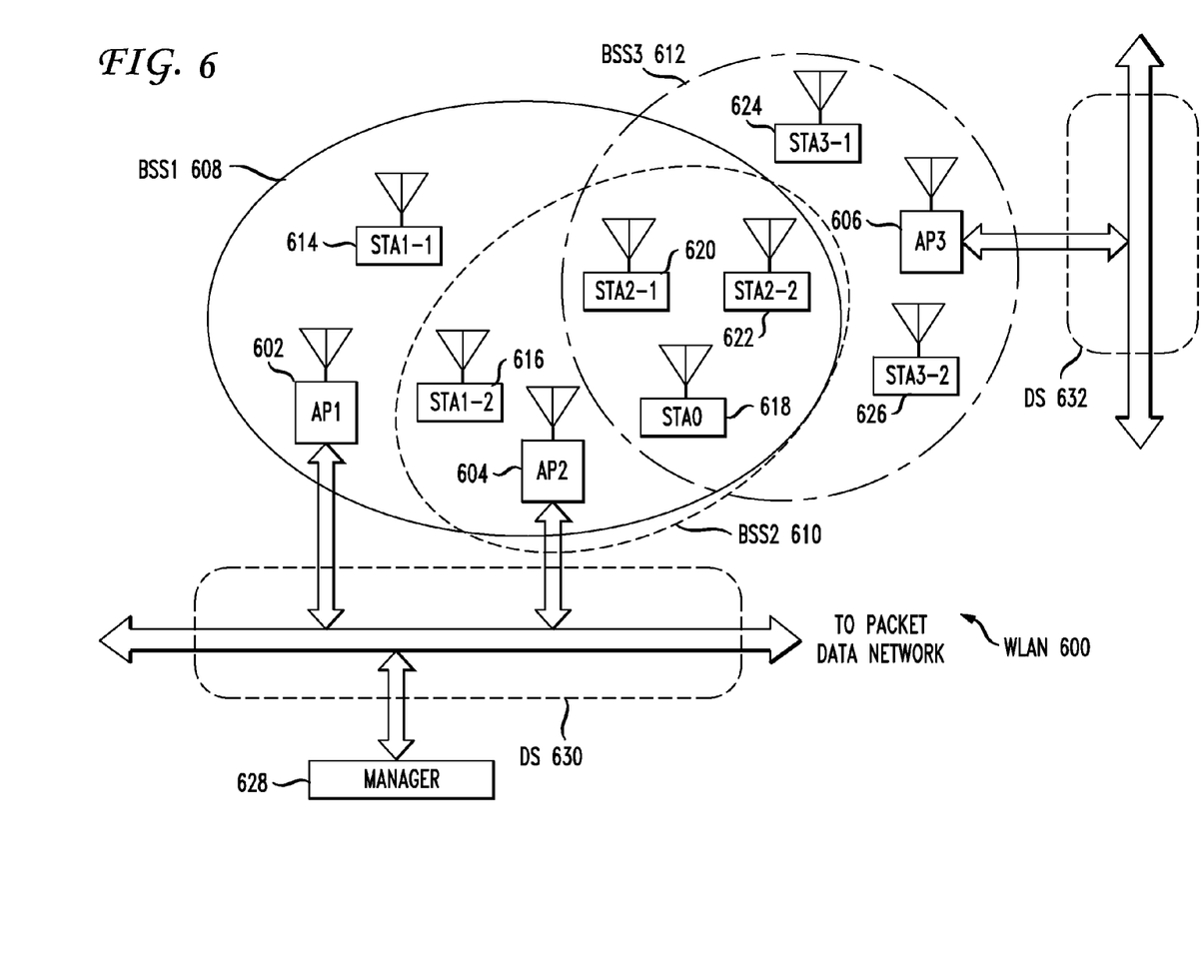
FIG. 6 shows a high-level schematic of a wireless local area network with three access points, one of which is a foreign access point.

Embodiments of the invention may be applied to WLANs with more than two APs, including APs that are not controlled by a single manager. FIG. 6 shows a high-level schematic of a WLAN 600 with three access points AP1 602-AP3 606. Their corresponding basic service sets are labeled as BSS1 608-BSS3 612. The RF coverage areas overlap as shown in the figure. Stations STA1-1 614 and STA1-2 616 are associated with AP1 602. Stations STA0 618, STA2-1 620, and STA2-2 622 are associated with AP2 604. Stations STA3-1 624 and STA3-2 626 are associated with AP3 606. The access points AP1 602 and AP2 604 connect to manager 628 via distribution system DS 630. The access point AP3 606 connects to a different distribution system DS 632. Distribution system DS 632 is not networked with distribution system DS 630. Access point AP3 606 is not controlled by manager 628. With respect to the WLAN accessed by AP1 602 and AP2 604 and controlled by manager 628, access point AP3 606 is referred to herein as a foreign access point. For example, AP1 602 and AP2 604 may belong to one service provider, and AP3 606 may belong to a second service provider.

Since manager 628 cannot control AP3 606, synchronization of AP1 602-AP3 606 proceeds differently from the instance shown in FIG. 3. The station STA0 618, which is positioned in an area with overlapping RF coverage from all three access points, AP1 602-AP3 606, is designated as the monitor station. In an advantageous embodiment, monitor station STA0 618 is stationary or fixed. Monitor station STA0 618 receives the beacons from AP1 602-AP3 606 and transmits the aggregate beacon information, including the times at which the beacons are received by monitor station STA0 618, to manager 628. Manager 628 then treats the beacon from AP3 606 as the fixed reference beacon. It then calculates retardation intervals for the beacons from AP1 602 and AP2 604. The retardation interval for the beacons from AP1 602 may differ from the retardation interval for the beacons from AP2 604. Manager 628 may also calculate adjusted beacon intervals and total contention-free periods for the beacons from AP1 602 and AP2 604. The adjusted beacon intervals and total contention-free periods for the beacons from AP1 602 may differ from the adjusted beacon intervals and total contention-free periods for the beacons from AP2 604. Manager 628 then issues control commands to AP1 602 and AP2 604 to retard transmission of their beacons by the corresponding retardation intervals. Manager 628 may also issue control commands to AP1 602 and AP2 604 to adjust their beacon intervals and total contention-free intervals. The retardation intervals, beacon intervals, and total contention-free periods may be calculated according to different criteria, which, for example, may be set by a network administrator. In one example, the values are calculated such the total contention-free period of AP1 602 does not overlap with the total contention-free period of AP2 604 and does not overlap with the total contention-free period of AP3 606. In another example, the values are calculated to minimize the overlap between the total contention-free periods of any two APs.

Figure 7:
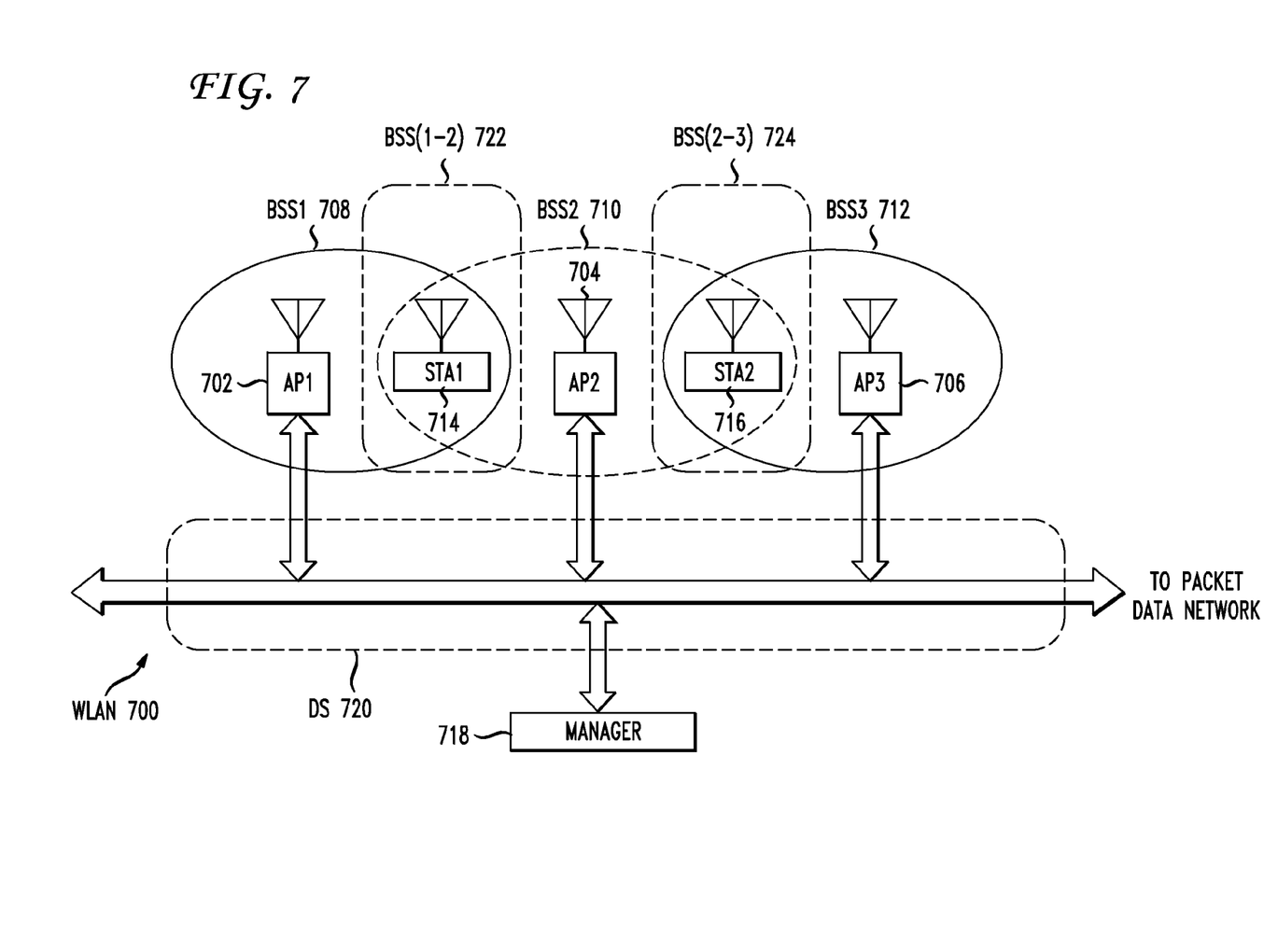
FIG. 7 shows a high-level schematic of a wireless local area network with three access points, including two monitor stations associated with separate access points.

Other embodiments may be used for more complex networks. FIG. 7 shows a high-level schematic of WLAN 700 with three access points AP1 702-AP3 706. The corresponding associated basic service sets are BSS1 708-BSS3 712. The three access points AP1 702-AP3 706 connect to distribution system DS 720, which connects to a packet data network, details of which are not shown. Manager 718 also connects to distribution system DS 720. Manager 718 communicates with and controls access points AP1 702-AP3 706. As shown in FIG. 7, the RF coverage area of access point AP1 702 overlaps with the RF coverage area of access point AP2 704. The overlapping RF coverage area is shown as BSS(1-2) 722. Similarly, the RF coverage area of access point AP2 704 overlaps the RF coverage area of access point AP3 706. The overlapping RF coverage area is shown as BSS(2-3) 724. Monitor station STA1 714 is positioned within BSS(1-2) 722 and receives beacons from both AP1 702 and AP2 704. Monitor station STA2 716 is positioned within BSS(2-3) 724 and receives beacons from both AP2 704 and AP3 706. Both monitor station STA1 714 and monitor station STA2 716 are associated with access point AP2 704.

Since beacons from AP2 704 are received by both monitor station STA1 714 and monitor station STA2 716, the beacons from AP2 704 may be used as a basis for synchronizing AP1 702-AP3 706. Monitor station STA1 records the time $t_{1,1}$ at which it receives Beacon 1 from AP1 702 and the time $t_{1,2}$ at which it receives Beacon 2 from AP2 704. Herein, the time at which a beacon is received by a monitor station is referred to as the arrival time of the beacon at the monitor station. Herein, the record of the arrival time is referred to as the arrival timestamp. The arrival times $t_{1,1}$ and $t_{1,2}$ are referenced to the radio clock of monitor station STA1. Similarly, monitor station STA2 records the arrival time $t_{2,2}$ at which it receives Beacon 2 from AP2 704 and the arrival time $t_{2,3}$ at which it receives Beacon 3 from AP3 706. The arrival times $t_{2,2}$ and $t_{2,3}$ are referenced to the radio clock of monitor station STA2. As discussed above, each beacon contains the transmission timestamp recording the time at which it is transmitted from its corresponding AP. The transmission timestamp is referenced to the radio clock of the corresponding AP. Let $\tau_1$, $\tau_2$, and $\tau_3$ denote the transmission timestamps of Beacon 1, Beacon 2, and Beacon 3, respectively. The aggregate beacon information, which includes the associated transmission and arrival times, is transmitted to manager 718. From the aggregate beacon information, manager 718 may calculate the time offset between the radio clock of AP2 704 and the radio clock of AP1 702, and the time offset between the radio clock of AP2 704 and the radio clock of AP3 706. Manager 718 may then determine a common timebase for WLAN 700. For example, the radio clock of AP2 704 may be used as the common reference clock for WLAN 700. Adjustment of the CFP schedules of BSS1 708-BSS3 712, corresponding to AP1 702-AP3 706, may then be performed by a method similar to that used to adjust the CFP schedules of BSS1 302 and BSS2 310, corresponding to AP1 304 and AP2 312, in WLAN 300 (see FIG. 3).

Figure 8:
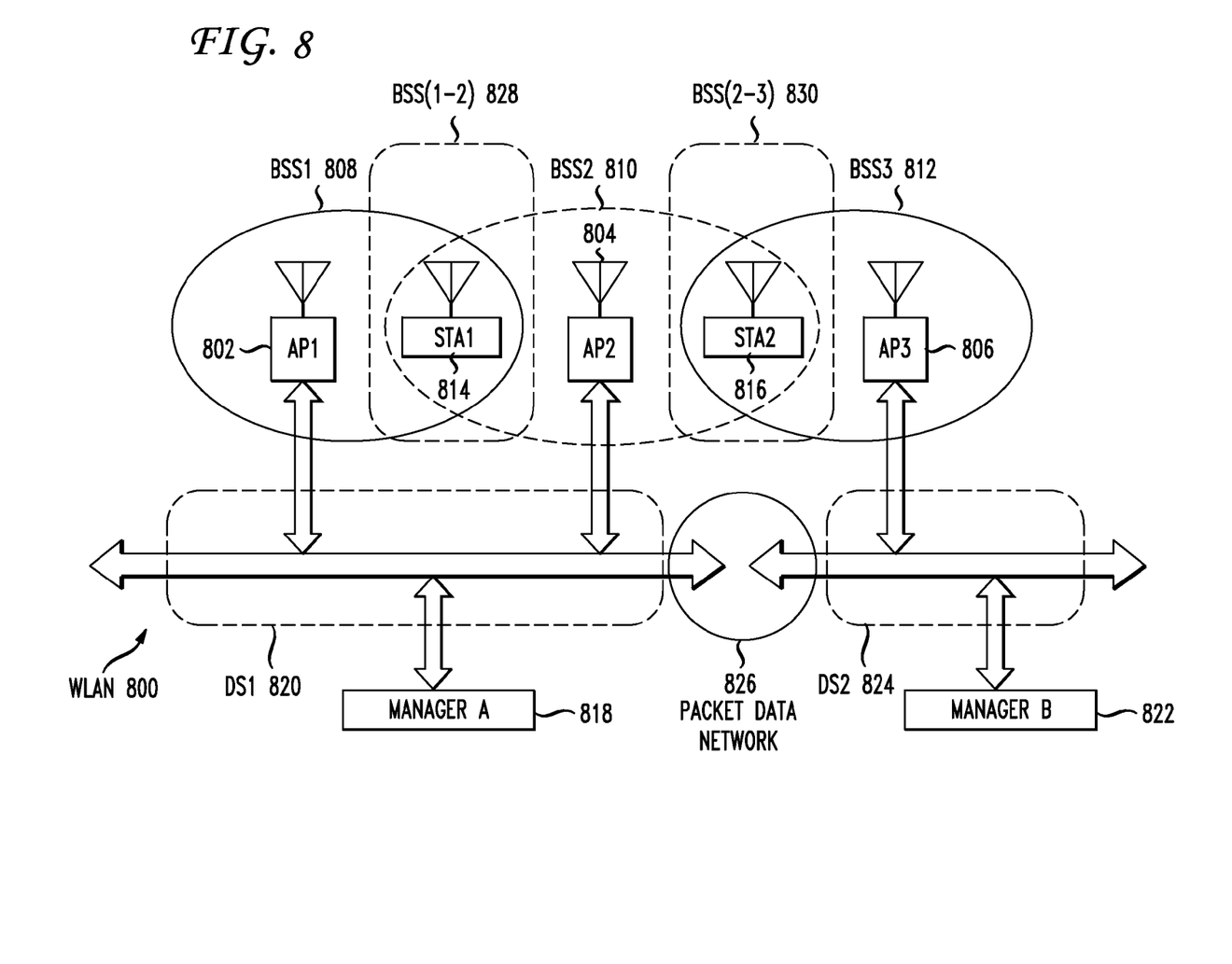
FIG. 8 shows a high-level schematic of a wireless local area network with three access points, including two separate managers; and, FIG. 9 shows a high-level schematic of a computer which may be used to execute a process for synchronizing the transmission periods of two or more access points.

FIG. 8 shows a high-level schematic of WLAN 800 with three access points AP1 802-AP3 806. The corresponding associated basic service sets are BSS1 808-BSS3 812. Access point AP1 802 and access point AP2 804 connect to distribution system DS1 820. Manager A 818 also connects to distribution system DS1 820. Manager A 818 communicates with and controls AP1 802 and AP2 804. Access point AP3 806 connects to distribution system DS2 824. Manager B also connects to distribution system DS2 824. Manager B communicates with and controls access point AP3 806. Distribution system DS1 820 and distribution system DS2 824 both connect to packet data network 826. Manager A 818 and Manager B 822 communicate via distribution system DS1 820, packet data network 826, and distribution system DS2 824.

As shown in FIG. 8, the RF coverage area of access point AP1 802 overlaps with the RF coverage area of access point AP2 804. The overlapping RF coverage area is shown as BSS(1-2) 828. Similarly, the RF coverage area of access point AP2 804 overlaps the RF coverage area of access point AP3 806. The overlapping RF coverage area is shown as BSS(2-3) 830. Monitor station STA1 814 is positioned within BSS(1-2) 828 and receives beacons from both AP1 802 and AP2 804. Monitor station STA2 816 is positioned within BSS(2-3) 830 and receives beacons from both AP2 804 and AP3 806. Monitor station STA1 802 is associated with AP2 804, and monitor station STA2 816 is associated with AP2 806. In this embodiment, to synchronize all three access points AP1 802-AP3 806, manager A 818 and manager B 822 exchange beacon information. Monitor station STA1 814 records the arrival time $t_{1,1}$ at which it receives Beacon 1 from AP1 802 and the arrival time $t_{1,2}$ at which it receives Beacon 2 from AP2 804. The arrival times $t_{1,1}$ and $t_{1,2}$ are referenced to the radio clock of monitor station STA1 814. The transmission timestamp $\tau_1$ referenced to the radio clock of AP1 802 marks the time at which Beacon 1 was transmitted from AP1 802. The transmission timestamp $\tau_2$ referenced to the radio clock of AP2 804 marks the time at which Beacon 2 was transmitted from AP2 804. Similarly, monitor station STA2 816 records the arrival time $t_{2,2}$ at which it receives Beacon 2 from AP2 804 and the arrival time $t_{2,3}$ at which it receives Beacon 3 from AP3 806. The arrival times $t_{2,2}$ and $t_{2,3}$ are referenced to the radio clock of monitor station STA2 816. The transmission timestamp $\tau_3$ referenced to the radio clock of AP3 806 marks the time at which Beacon 3 was transmitted from AP3 806.

The aggregate beacon information, which includes the associated transmission and arrival times, from monitor station STA1 814 is transmitted to manager A 818. The aggregate beacon information from monitor station STA2 816 is transmitted to manager B 822. Manager A 818 and manager B 822 exchange their respective aggregate beacon information. Manager A 818 and manager B 822 then each have the aggregate beacon information from all three access points AP1 802-AP3 806. Manager A 818 and manager B 822 may then negotiate to determine which one serves as the primary manager for WLAN 800. In another embodiment, manager A 818 and manager B 822 transmit their respective aggregate beacon information to a third manager, which serves as the primary manager for WLAN 800. The situation is then similar to the one discussed above for WLAN 700 (see FIG. 7). The primary manager (for example, manager A 818) establishes a common timebase and adjusts the CFP schedules of BSS1 808-BSS3 812, corresponding to AP1 802-AP3 806, according to pre-defined network criteria.

Figure 9:
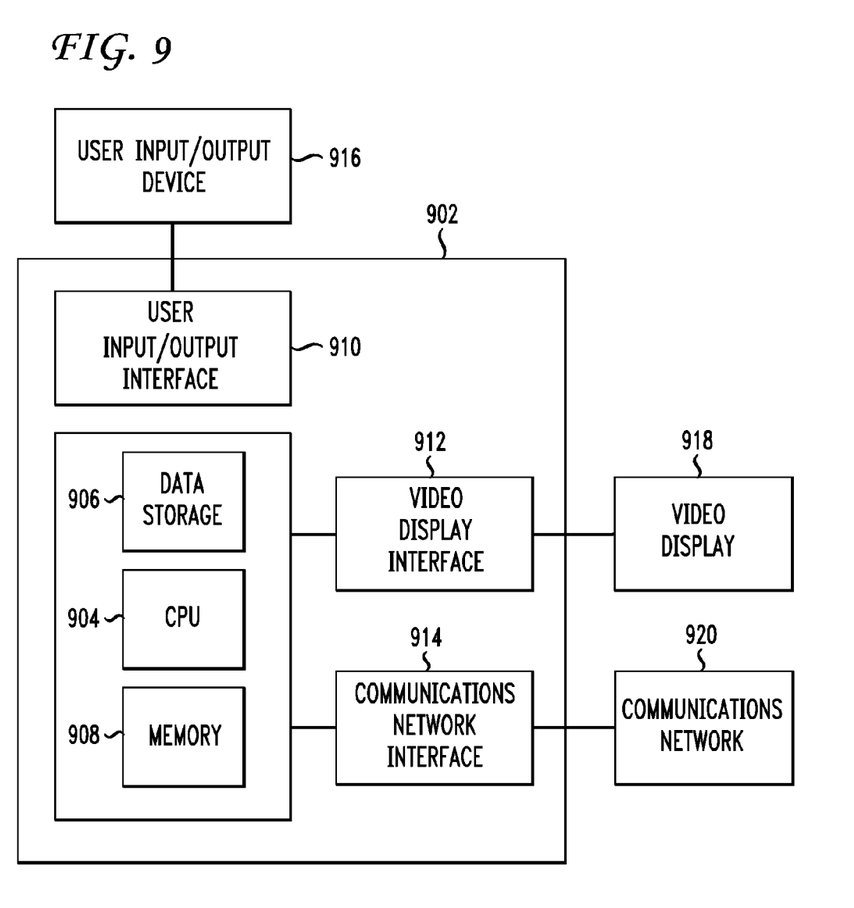

One embodiment of a manager which synchronizes two or more access points may be implemented using a computer. As shown in FIG. 9, computer 902 may be any type of well-known computer comprising a central processing unit (CPU) 904, memory 908, data storage 906, and user input/output interface 910. Data storage 906 may comprise a hard drive or non-volatile memory. User input/output interface 910 may comprise a connection to a user input device 916, such as a keyboard or mouse. As is well known, a computer operates under control of computer software which defines the overall operation of the computer and applications. CPU 904 controls the overall operation of the computer and applications by executing computer program instructions which define the overall operation and applications. The computer program instructions may be stored in data storage 906 and loaded into memory 908 when execution of the program instructions is desired. Computer 902 may further comprise a video display interface 912, which may transform signals from CPU 904 to signals which may drive video display 918. Computer 902 may further comprise one or more network interfaces. For example, communications network interface 914 may comprise a connection to an Internet Protocol (IP) communications network 920, which may transport user traffic. For example, communications network interface 914 may connect to distribution system DS 320 (see FIG. 3). Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus for synchronizing a first wireless access point, a second wireless access point, and a third wireless access point transmitting and receiving data on a common radiofrequency (RF) channel, wherein the RF coverage area of the first wireless access point and the RF coverage area of the second wireless access point overlap in a first overlap area, wherein the RF coverage area of the second wireless access point and the RF coverage area of the third wireless access point overlap in a second overlap area, wherein the first wireless access point transmits a first beacon including a first transmission timestamp and a first contention-free period (CFP) schedule, wherein the second wireless access point transmits a second beacon including a second transmission timestamp and a second CFP schedule, and wherein the third wireless access point transmits a third beacon including a third transmission timestamp and a third CFP schedule, the apparatus comprising:

means for receiving first beacon information from a first monitor station positioned in the first overlap area, the first beacon information comprising the first transmission timestamp, the first CFP schedule, a first arrival time recording the time at which the first beacon is received at the first monitor station, the second transmission timestamp, the second CFP schedule, and a second arrival time recording the time at which the second beacon is received at the first monitor station;

means for receiving second beacon information from a second monitor station positioned in the second overlap area, the second beacon information comprising the second transmission timestamp, the second CFP schedule, a third arrival time recording the time at which the second beacon is received at the second monitor station, the third transmission timestamp, the third CFP schedule, and a fourth arrival time recording the time at which the third beacon is received at the second monitor station;

means for determining a common timebase; and, means for transmitting control commands to adjust:

the first CFP schedule to generate an adjusted first CFP schedule;
the second CFP schedule to generate an adjusted second CFP schedule; and
the third CFP schedule to generate an adjusted third CFP schedule.

2. The apparatus of claim 1 wherein the first wireless access point, the second wireless access point, and the third wireless access point are IEEE 802.11 access points.

3. The apparatus of claim 1, further comprising:
means for recording by the first monitor station the first arrival time and the second arrival time, wherein the recorded first arrival time and the recorded second arrival time are referenced to a first clock in the first monitor station; and
means for recording by the second monitor station the third arrival time and the fourth arrival time, wherein the recorded third arrival time and the recorded fourth arrival time are referenced to a second clock in the second monitor station.

4. The apparatus of claim 1, wherein the first wireless access point comprises a first clock, wherein the second wireless access point comprises a second clock, and wherein the third wireless access point comprises a third clock, the apparatus further comprising:
means for calculating a first time offset between the first clock and the second clock; and
means for calculating a second time offset between the second clock and the third clock.

5. The apparatus of claim 1, further comprising:
means for calculating the adjusted first CFP schedule;
means for calculating the adjusted second CFP schedule; and
means for calculating the adjusted third CFP schedule.

6. A non-transitory computer readable medium storing computer program instructions for synchronizing a first wireless access point, a second wireless access point, and a third wireless access point transmitting and receiving data on a common radiofrequency (RF) channel, wherein the RF coverage area of the first wireless access point and the RF coverage area of the second wireless access point overlap in a first overlap area, wherein the RF coverage area of the second wireless access point and the RF coverage area of the third wireless access point overlap in a second overlap area, wherein the first wireless access point transmits a first beacon including a first transmission timestamp and a first contention-free period (CFP) schedule, wherein the second wireless access point transmits a second beacon including a second transmission timestamp and a second CFP schedule, and wherein the third wireless access point transmits a third beacon including a third transmission timestamp and a third CFP schedule, the computer program instructions defining the steps of:
receiving first beacon information from a first monitor station positioned in the first overlap area, the first beacon information comprising the first transmission timestamp, the first CFP schedule, a first arrival time recording the time at which the first beacon is received at the first monitor station, the second transmission timestamp, the second CFP schedule, and a second arrival time recording the time at which the second beacon is received at the first monitor station;
receiving second beacon information from a second monitor station positioned in the second overlap area, the second beacon information comprising the second transmission timestamp, the second CFP schedule, a third arrival time recording the time at which the second beacon is received at the second monitor station, the third transmission timestamp, the third CFP schedule, and a fourth arrival time recording the time at which the third beacon is received at said second monitor station;
determining a common timebase; and
transmitting control commands to adjust:
the first CFP schedule to generate an adjusted first CFP schedule;
the second CFP schedule to generate an adjusted second CFP schedule; and
the third CFP schedule to generate an adjusted third CFP schedule.

7. The non-transitory computer readable medium of claim 6 wherein the first wireless access point, the second wireless access point, and the third wireless access point are IEEE 802.11 access points.

8. The non-transitory computer readable medium of claim 6, wherein the computer program instructions further comprise computer program instructions defining the steps of:
recording by the first monitor station the first arrival time and the second arrival time, wherein the recorded first arrival time and the recorded second arrival time are referenced to a first clock in the first monitor station; and
recording by the second monitor station the third arrival time and the fourth arrival time, wherein the recorded third arrival time and the recorded fourth arrival time are referenced to a second clock in the second monitor station.

9. The non-transitory computer readable medium of claim 6, wherein the first wireless access point comprises a first clock, wherein the second wireless access point comprises a second clock, wherein the third wireless access point comprises a third clock, and wherein the computer program instructions further comprise computer program instructions defining the steps of:
calculating a first time offset between the first clock and the second clock; and
calculating a second time offset between the second clock and the third clock.

10. The non-transitory computer readable medium of claim 6, wherein the computer program instructions further comprise computer program instructions defining the steps of:
calculating the adjusted first CFP schedule;
calculating the adjusted second CFP schedule; and
calculating the adjusted third CFP schedule.

* * * * *